United States Patent
Saltsidis (10) Patent No.: US 8,837,299 B2
(45) Date of Patent: Sep. 16, 2014

(54) CONNECTIVITY FAULT MANAGEMENT IN A PROVIDER BACKBONE BRIDGE TRAFFIC ENGINEERING (PBB-TE) DOMAIN

(75) Inventor: Panagiotis Saltsidis, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 100 days.

(21) Appl. No.: 13/405,610

(22) Filed: Feb. 27, 2012

(65) Prior Publication Data

US 2012/0155281 A1 Jun. 21, 2012

Related U.S. Application Data

(63) Continuation of application No. 12/442,748, filed as application No. PCT/IB2008/002855 on Oct. 27, 2008, now Pat. No. 8,125,890.

(60) Provisional application No. 60/984,572, filed on Nov. 1, 2007.

(51) Int. Cl.
*H04L 12/26* (2006.01)
*H04L 12/24* (2006.01)
*H04L 12/46* (2006.01)
*H04L 12/28* (2006.01)
*H04L 12/709* (2013.01)

(52) U.S. Cl.
CPC ............ *H04L 12/2856* (2013.01); *H04L 41/06* (2013.01); *H04L 12/4641* (2013.01); *H04L 45/245* (2013.01)
USPC ........... 370/241; 370/248; 370/242; 370/249; 370/401

(58) Field of Classification Search
USPC ........................ 370/241, 242, 248, 249, 401
See application file for complete search history.

(56) References Cited

U.S. PATENT DOCUMENTS

| | | | |
|---|---|---|---|
| 7,355,978 B2 | 4/2008 | Fontana et al. | |
| 7,505,418 B1 | 3/2009 | Liang et al. | |
| 7,519,004 B1 | 4/2009 | Kamity et al. | |
| 7,710,888 B2 | 5/2010 | DelRegno et al. | |
| 2006/0159008 A1 | 7/2006 | Sridhar et al. | |
| 2007/0140126 A1 | 6/2007 | Osswald et al. | |
| 2007/0286204 A1* | 12/2007 | Ould-Brahim | 370/395.5 |
| 2008/0016402 A1 | 1/2008 | Harel et al. | |

(Continued)

OTHER PUBLICATIONS

"PBB-TE (802.1Qay) CFM: ay-mohan-cfm-0707-v01", IEEE Draft; AY-MOHAN-CFM-0707-V01, IEEE-SA, Piscataway, NJ USA; vol. 802.1, No. v01, Jul. 18, 2007, pp. 1-24, XP017641643 [retrieved on Jul. 18, 2007].

(Continued)

*Primary Examiner* — Joey Bednash
*Assistant Examiner* — Kuo T Chiang (57) ABSTRACT

A system and method for providing Connectivity Fault Management, CFM, in a Provider Backbone Bridge Traffic Engineering, PBB-TE, telecommunication network utilizing Ethernet-based packet transport. PBB-TE point-to-point and point-to-multipoint services are identified, and PBB-TE maintenance points (31, 41) associated with the identified PBB-TE services are addressed. The addressed PBB-TE maintenance points are modified by adding a PBB-TE Service Demultiplexer (32, 42) to each PBB-TE maintenance point for identifying independent PBB-TE service instances. Basic CFM protocols are enhanced to duplicate the behavior of CFM protocols on virtual local area network, VLAN, based maintenance associations. The PBB-TE maintenance points may be Maintenance association End Points, MEPs, and Maintenance association Intermediate Points, MIPs.

22 Claims, 4 Drawing Sheets

(56) References Cited

U.S. PATENT DOCUMENTS

| | | | |
|---|---|---|---|
| 2008/0080535 A1* | 4/2008 | Li et al. ................... | 370/401 |
| 2008/0170578 A1 | 7/2008 | Ould-Brahim | |
| 2008/0170583 A1 | 7/2008 | Sultan et al. | |
| 2008/0172497 A1 | 7/2008 | Mohan et al. | |
| 2008/0267080 A1* | 10/2008 | Sultan et al. ............. | 370/248 |
| 2008/0279110 A1 | 11/2008 | Hart et al. | |
| 2009/0168783 A1 | 7/2009 | Mohan et al. | |
| 2010/0182902 A1 | 7/2010 | Saltsidis | |
| 2010/0195492 A1* | 8/2010 | Harmatos et al. ........ | 370/230 |
| 2011/0058483 A1 | 3/2011 | Mohan et al. | |
| 2014/0086064 A1 | 3/2014 | Mohan et al. | |

OTHER PUBLICATIONS

IEEE: "pp. 114-181 of IEEE P802.1ag/D8.1 Draft Standard for Local and Metropolitan Area Networks—Virtual Bridged Local Area Networks Amendment 5: Connectivity Fault Management", Internet Citation, Jun. 18, 2007, pp. I-XIII, XP002526014, Retrieved from the Internet: URL:http://ieeexplore.ieee.org/stamp/stamp.jsp?arnumber=04278937 [retrieved on Jun. 18, 2007].

IEEE Computer Society: "Virtual Bridged Local Area Networks ? Amendment 5: Connectivity Fault Management (part)". Jun. 18, 2007, pp. 122-182, XP002524313, Retrieved from the Internet: URL:http://ieeexplore.ieee.org/stamp/stampD.jsp?arnumber=4343668$isnumber=4343667 [retrieved on Apr. 15, 2009].

Siemens: "Metro Ethernet Deployment With Siemens PBB-TE", Mar. 13, 2007, pp. 1-14, XP002524312, Retrieved from the Internet: URL:http://optical.usa.siemens.com/carrierethernet/downloads/Metro%20Ethernet$20Deployment%20with%20Siemens$20PBB-TE.pdf [retrieved on Apr. 15, 2009].

"PBT—Carrier Grade Ethernet Transport", Internet Citation, Dec. 31, 2006. pp. 1-17. XP002501602, Retrieved from the Internet: URL:http://downloads.lightreading.com/wplib/tpack/TPACK_PBT_WP_v1_web.pdf [retrieved on Oct. 21, 2006].

Panagiotis Saltsidis—Ericsson: "IEEE802.1Qay/D0.0", May 30, 2007, XP002524314, Retrieved from the Internet: URL:http://www.ieee802.org/1/files/public/docs207/ay-saltsidis-initial-draft-0507.pdf [retreived on Apr. 16, 2009].

* cited by examiner

FIG. 5

CONNECTIVITY FAULT MANAGEMENT IN A PROVIDER BACKBONE BRIDGE TRAFFIC ENGINEERING (PBB-TE) DOMAIN

CLAIMING BENEFIT OF PRIOR FILED U.S. APPLICATION

This application is a continuation of International Application PCT/IB2008/002855, with an international filing date of Oct. 27, 2008, which corresponds to the national-stage entry U.S. patent application Ser. No. 12/442,748, filed Mar. 25, 2009, and which claims the benefit of U.S. Provisional Application No. 60/984,572, filed Nov. 1, 2007, and the contents of all of the preceding are hereby incorporated by reference herein.

TECHNICAL FIELD

The present invention relates to telecommunication networks. More specifically, and without limitation, the invention is directed to a system and method for providing Connectivity Fault Management (CFM) in Provider Backbone Bridge Traffic Engineering (PBB-TE) telecommunication networks utilizing Ethernet-based packet transport.

BACKGROUND

The following abbreviations are utilized throughout this document:
  B-BEBB-component of a Backbone Edge Bridge
  CCM Continuity Check Message
  CFM Connectivity Fault Management
  CBP Customer Backbone Port
  ESP Ethernet Switched Path
  IEEE Institute of Electrical and Electronics Engineers
  I-SID Backbone Service Instance Identifier
  LAN Local Area Network
  LBM/LBR Loopback Message/Loopback Reply
  LTM/LTR Linktrace Message/Linktrace Reply
  MAC Media Access Control
  MEP Maintenance association End Point
  MIP Maintenance association Intermediate Point
  MP Maintenance Point (MEP or MP)
  PBB Provider Backbone Bridge
  PBBN Provider Backbone Bridged Network
  PBB-TE Provider Backbone Bridges Traffic Engineering,
  PIP Provider Instance Port
  SAP Service Access Point
  TLV Type, Length, Value
  VID VLAN Identifier Ethernet has become the undisputed leading Local Area Network (LAN) technology. This achievement stems from the intrinsic characteristics of the technology: simple, cheap, easy to manage, and backward compatible.

Telecommunication operators and carriers are looking at the possibility of reaping the same benefits by replacing the SONET/SDH infrastructure of their metro and backbone networks with an Ethernet-based packet transport infrastructure since data services now account for the bulk of traffic. However, metro and backbone networks have quite different requirements than enterprise LANs. Consequently, Ethernet technology requires specific enhancements if it is to fulfill these carrier-grade requirements. Current work carried out at the Institute of Electrical and Electronics Engineers (IEEE) on the Provider Backbone Bridge Traffic Engineering (PBB-TE) concept is intended to amend the Ethernet 802.1Q standard to provide a true carrier-grade packet transport solution based on Ethernet. (See, IEEE P802.1Q—2006/D0.1, Draft IEEE Standard for Local and Metropolitan Area Networks: Virtual Bridged Local Area Networks).

PBB-TE (i.e., IEEE P802.1Qay/D0.0, Draft Standard for Local and Metropolitan Area Networks—Virtual Bridged Local Area Networks—Amendment ?: Provider Backbone Bridges—Traffic Engineering, May 2007) proposes a simple, connection-oriented solution. PBB-TE maintains the inherent advantages of Ethernet, while addressing the deficiencies of Ethernet as a carrier-class packet transport protocol. It builds upon the concepts brought forth in the amendments to IEEE 802.1Q to provide a scalable solution, mainly the network separation of PBB in IEEE P802.1ah/D3.8, Draft Standard for Local and Metropolitan Area Networks—Virtual Bridged Local Area Networks—Amendment ?: Provider Backbone Bridges, October 2007.

Connectivity Fault Management (CFM) is a very important component in enhancing Ethernet with carrier-grade functionality. IEEE has specified protocols, procedures, and managed objects to support connectivity fault management. (See, IEEE P802.1ag/D8.1, Approved Standard for Local and Metropolitan Area Networks—Virtual Bridged Local Area Networks—Amendment 05: Connectivity Fault Management, June 2007). These protocols, procedures, and managed objects enable discovery and verification of the path, through bridges, and LANs (taken for frames addressed to and from specified network users) as well as detection of a connectivity fault and isolation of the fault to a specific bridge or LAN.

SUMMARY

The original CFM protocol, however, was designed to monitor best-effort Ethernet services. The PBB-TE domain requires a higher level of quality, and consequently, direct application of the original CFM protocol to the PBB-TE domain does not work. Enhancements to the original CFM specification are required in order to generalize its original mechanisms in a way that they are applicable to PBB-TE services.

The current CFM specification enables the configuration of Maintenance Associations (MAs) that can monitor service instances such as traditional VLAN service instances or backbone service instances based on VLAN Identifiers (VIDs) or Backbone Service Instance Identifiers (I-STDs), respectively. These services and the corresponding monitoring MAs are distinguished based on their VIDs or their I-SIDS. In the case of PBB-TE, however, a single parameter can no longer uniquely identify a PBB-TE service. In particular, I-SIDs are not visible within a PBB-TE domain, and the VID parameters are not unique because they can be re-used by independent PBB-TE service instances.

The present invention provides a consistent way of identifying PBB-TE point-to-point and point-to-multipoint services; provides a methodology for addressing PBB-TE associated Maintenance Points (MPs); enhances MPs such as Maintenance association End Points (MEPs) and Maintenance association Intermediate Points (MIPs) with additional PBB-TE demultiplexing functionality for identifying independent PBB-TE service instances; and provides enhancements to the basic CFM protocols (i.e., Continuity Check, Loopback, and Linktrace protocols), thereby enabling the same behavior as that experienced by their operation on traditional VLAN-based MAs.

In one embodiment, the present invention is directed to a method of providing CFM in a PBB-TE telecommunication network utilizing Ethernet-based packet transport. The method includes the steps of identifying PBB-TE point-topoint and point-to-multipoint services; addressing PBB-TE maintenance points associated with the identified PBB-TE services; modifying the addressed PBB-TE maintenance points by adding to each PBB-TE maintenance point, a PBB-TE Service Demultiplexer for identifying independent PBB-TE service instances; and enhancing basic CFM protocols to duplicate the behavior of CFM protocols on VLAN-based maintenance associations. The PBB-TE maintenance points may include MEPs and MIPs.

In another embodiment, the present invention is directed to a system for providing CFM in a PBB-TE telecommunication network utilizing Ethernet-based packet transport. The system includes a PBB-TE maintenance point, which includes a PBB-TE Service Demultiplexer for identifying independent PBB-TE service instances. The system also includes means for addressing the PBB-TE maintenance point; and enhanced CFM protocols adapted to duplicate the behavior of CFM protocols on VLAN-based maintenance associations. The PBB-TE maintenance point may be a MEP or a MIP.

In another embodiment, the present invention is directed to a PBB-TE maintenance point for providing CFM in a PBB-TE telecommunication network utilizing Ethernet-based packet transport. The PBB-TE maintenance point includes a PBB-TE Service Demultiplexer for identifying independent PBB-TE service instances; and means for operating enhanced CFM protocols adapted to duplicate the behavior of CFM protocols on VLAN-based maintenance associations. The PBB-TE maintenance point may be a MEP or a MIP.

BRIEF DESCRIPTION OF THE DRAWINGS

In the following, the essential features of the invention will be described in detail by showing preferred embodiments, with reference to the attached figures in which.

DETAILED DESCRIPTION

Figure 1:
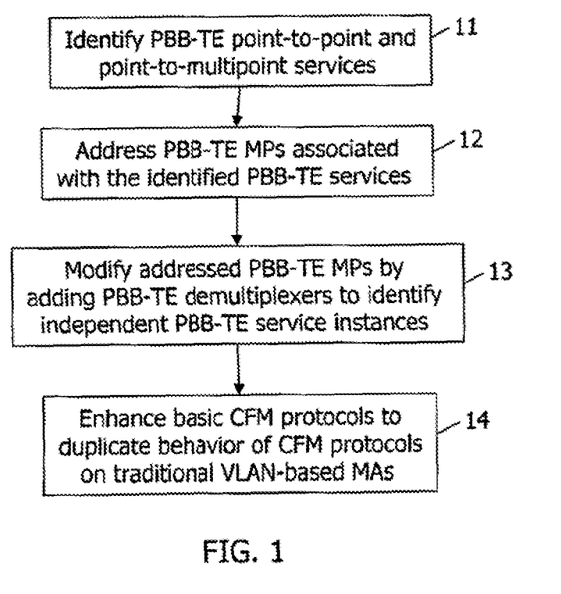
FIG. 1 is a flow chart illustrating the steps of an exemplary embodiment of the method of the present invention.

FIG. 1 is a flow chart illustrating the steps of an exemplary embodiment of the method of the present invention. The invention provides CFM in PBB-TE telecommunication networks utilizing Ethernet-based packet transport. At step 11, PBB-TE point-to-point and point-to-multipoint services are identified. At step 12, PBB-TE maintenance points associated with the identified PBB-TE services are addressed. At step 13, the addressed PBB-TE maintenance points are modified by adding PBB-TE demultiplexers, which identify independent PBB-TE service instances. At step 14, basic CFM protocols are enhanced to duplicate the behavior that the CFM protocols exhibit on traditional VLAN-based maintenance associations.

PBB-TE replaces the MSTP control plane with either a management plane or an external control plane and then populates the bridge filtering tables of the component 802.1ad and 802.1ah Bridge relays by creating static filtering table entries. The external PBB-TE management/control plane is responsible for maintaining and controlling all the topology information to support point-to-point or point-to-multipoint unidirectional Ethernet Switched Paths (ESPs) over the Provider Backbone Bridged Network (PBBN). The management/control plane is used to configure the Static Filtering Entries in the PBB bridges and in this way create a connection path within a PBBN.

Each such unidirectional ESP is identified by a 3-tuple <ESP-MAC DA, ESP-MAC SA, ESP-VID>. In one embodiment, the ESP-MAC DA identifies the Provider Instance Port (PIP) destination address. The ESP-MAC SA is the source address, i.e., the address of the PIP encapsulating the customer service instance in a backbone service instance identified by an I-SID value. The ESP-VID is the vlan_identifier related to the service. The ESP-VID can only take values that are allocated to the PBB-TE domain identified by a special Multiple Spanning Tree Instance Identifier (MSTID).

In another embodiment, the ESP-VID for a given MEP has the value of the ESP-VID parameter identifying a component ESP that has the given MEP's MAC address as its ESP-MAC source address parameter, and the MAC address of the given MEP is the MAC address of the Customer Backbone Port, CBP, and the Provider Instance Port, PIP, MAC address is set equal to the MAC address of the connected CPB port.

Both embodiments above result in having PIP MAC addresses equal to CBP MAC addresses for PIP/CBP connected ports.

A Point-To-Point (PtP) PBB-TE service instance (PBB-TE trunk) is identified by a pair of co-routed unidirectional ESPs and correspondingly by a pair of 3-tuples:

<DA1, SA1, VID1>
<SA1, DA1, VID2>

The VLAN identifiers (VID1 and VID2) can be the same or in the generic case they can be different.

A Point-To-Multipoint (PtMP) PBB-TE service instance is identified by one multipoint multicast ESP plus n unidirectional ESPs routed along the leaves of the multicast ESP and correspondingly by n+1 3-tuples:

<MDA, SA, VID>
<SA, SA1, VID1>
<SA, SA2, VID2>
. . .
<SA, SAn, VIDn>

The Multicast DA (MDA) identifies a list of MAC addresses {SA1, SA2, . . . , SAn}. Even though the MAC address parameters used to identify ESPs are set on PIPs, the actual ESPs are provisioned between Customer Backbone Ports (CBPs).

Addressing PBB-TE MPs

In order to monitor PBB-TE services, maintenance associations (MAs) must be configured. In one embodiment, each such MA is configured by the same set of parameters that are required to identify the corresponding PBB-TE service (i.e., a list of the component ESPs). So instead of providing a list of VI Ds or an I-SID as parameters, the list of the component ESPs is required, each identified by the 3-tuple <ESP-MAC DA, ESP-MAC SA, ESP-VID>.

The MEPs related to a PBB-TE service require the same set of parameters as a VLAN-based MEP requires, with the following changes:

1. The Primary VID is not writable, but always gets the value of the ESP-VID parameter identifying the component ESP that has the MEP's MAC address as its ESP-MAC SA parameter; and 2. The MAC address of the MEP is the MAC address of the PIP port which is connected to the CBP port upon which the MEP is operating.

MP Architectural Enhancements

Figure 2:
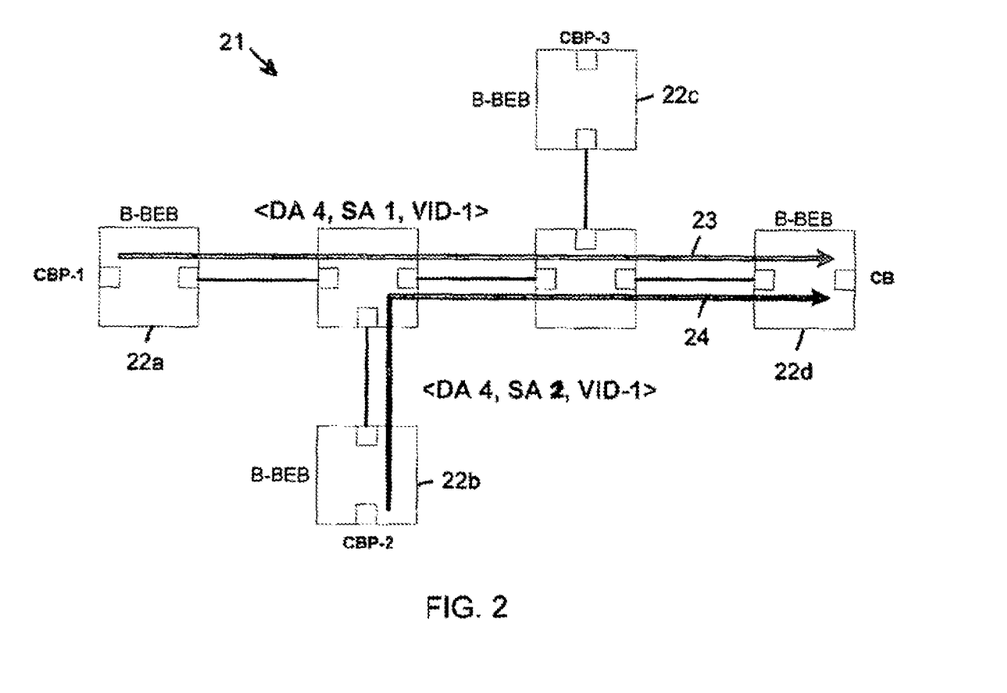
FIG. 2 is a simplified block diagram of a network of B-components of Backbone, Edge Bridges (B-BEBs) illustrating two independent Ethernet Switched Paths (ESPs) using the same VID.

FIG. 2 is a simplified block diagram of a network 21 of B-components of Backbone Edge Bridges (B-BEBs) 22a-d illustrating two independent ESPs using the same VID. Independent ESPs may be identified by the same VID value if some other parameter in their identifying 3-tuple is different. FIG. 2 illustrates a case in which a first ESP 23 is distinguished from a second ESP 24 by their source addresses, SA1 and SA2. The current MEP architecture assumes that the services are distinguished by their VIDs. Since the VIDs are the same, the current MEP architecture cannot distinguish CFM PDUs from these two different maintenance associations. Enhancements to the MP's architecture are required in order to be able to correctly distinguish such MAs. The present invention provides the required enhancements to the MEP and MIP Half Function (MHF) architectures.

Figure 3:
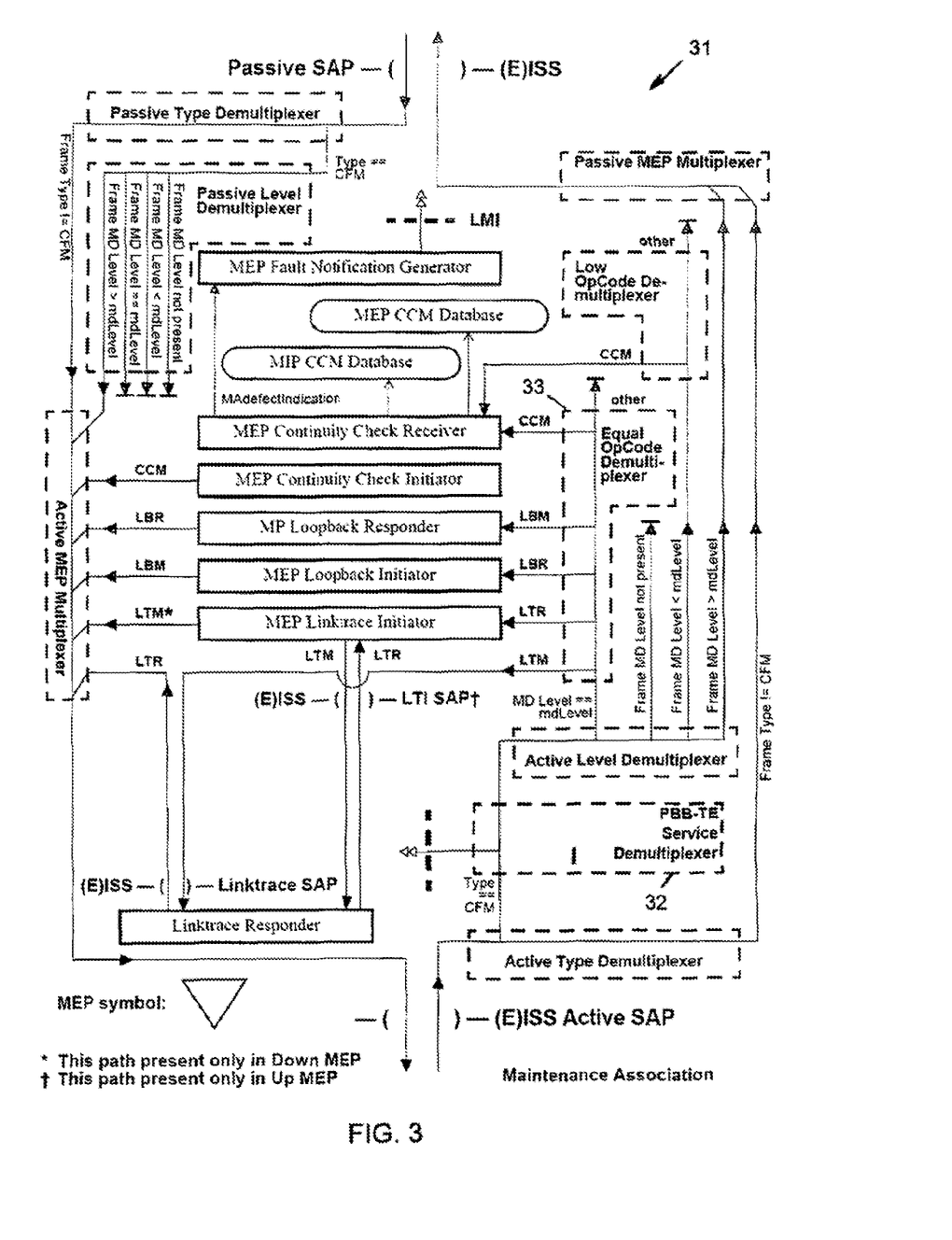
FIG. 3 is a simplified block diagram of a modified Maintenance association End Point (MEP) in an exemplary embodiment of the present invention.

FIG. 3 is a simplified block diagram of a modified Maintenance association End Point (MEP) 31 in an exemplary embodiment of the present invention. The MEP includes a new component, an MP PBB-TE Service Demultiplexer 32. The PBB-TE service Demultiplexer checks the source_address of CFM PDUs and separates the CFM PDUs that belong to the monitored PBB-TE MA by forwarding those CFM PDUs towards an Equal OpCode Demultiplexer 33. If the CFM PDU is identified as not belonging to the MA associated with the MEP, the destination_address, source_address, and VID parameters of the corresponding PDUs are forwarded to a local management entity (not shown) for inspection. If no MEP with those parameters is configured on the receiving port, a cross-connect defect is raised.

Figure 4:
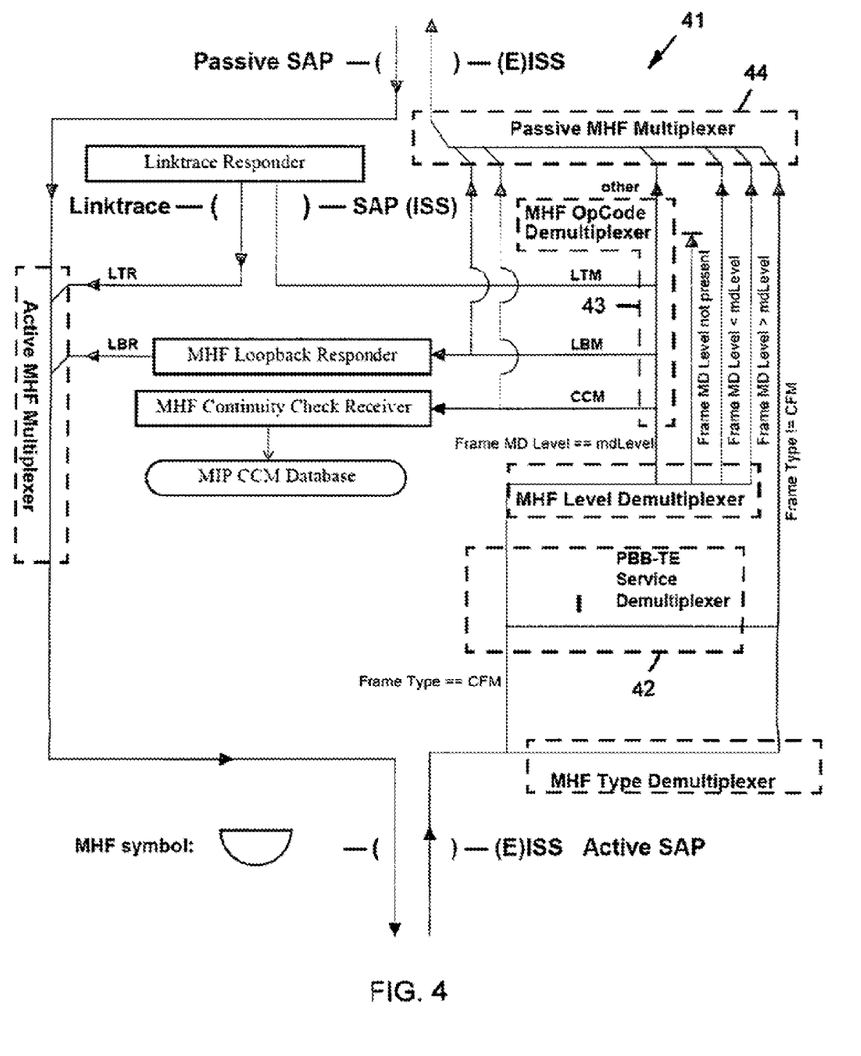
FIG. 4 is a simplified block diagram of a modified Maintenance association Intermediate Point (MIP) Half Function (MHF) in an exemplary embodiment of the present invention.

FIG. 4 is a simplified block diagram of a modified Maintenance association Intermediate Point (MIP) Half Function (MHF) 41 in an exemplary embodiment of the present invention. The MHF also includes a new MP PBB-TE Service Demultiplexer 42. The PBB-TE service Demultiplexer checks the source_address of CFM PDUs and separates the CFM PDUs that belong to the monitored PBB-TE MA by forwarding those CFM PDUs towards an MHF OpCode Demultiplexer 43. The MHF PBB-TE service Demultiplexer 42 forwards frames with source_address not recognized by the MHF to a Passive MHF Multiplexer 44.

Enhancements of the CFM Protocols

Figure 5:
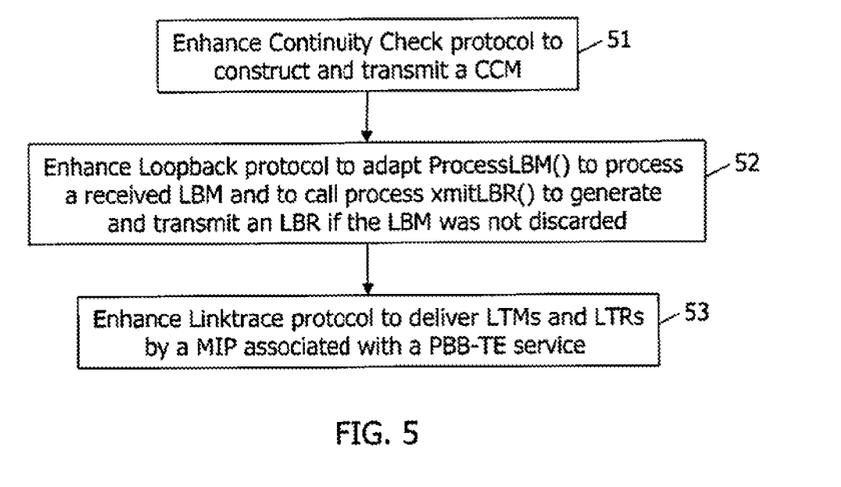
FIG. 5 is a flow chart illustrating the steps of an exemplary method of enhancing CFM protocols according to the teachings of the present invention.

FIG. 5 is a flow chart illustrating the steps of an exemplary method of enhancing CFM protocols according to the teachings of the present invention. Three basic CFM protocols are enhanced in the present invention. At step 51, the Continuity Check protocol is enhanced to construct and transmit a Continuity Check Message (CCM) in the PBB-TE context. At step 52, the Loopback protocol is enhanced to adapt ProcessLBM( ) to process a received Loopback Message (LBM) and to call process xmitLBR( ) to generate and transmit a Loopback Reply (LBR) if the LBM was not discarded. At step 53, the Linktrace protocol is enhanced to deliver Linktrace Messages (LTMs) and Linktrace Replies (LTRs) by a MIP associated with a PBB-TE service. Specific details of the enhancements are described below.

Continuity Check protocol. A change is required in the procedure responsible for constructing and transmitting a CCM. In particular, the destination_address parameter is set to the ESP-MAC DA field of the ESP having as its ESP-MAC SA, the MAC address of the MEP emitting the CCM. All other processes remain the same.

Loopback protocol. The original Lookback Message ProcessLBM( ) procedure used by the Loopback Responder state machine in 20.26.1 of IEEE802.1ag/D8.1 is changed as follows:

ProcessLBM( )

Process LBM( ) is called by the MP Loopback Responder state machine whenever a Loopback Message (LBM) is received. ProcessLBM( ) processes the LBM in LBMPDU as follows:

1. If the destination_address parameter contains either an Individual MAC address that does not match the MAC address of the receiving MP or an Individual MAC address that does not match the ESP MAC-DA of any of the ESPs composing the PBB-TE associated with this MP, then ProcessLBM( ) discards the LBM and performs no further processing.

2. If the destination_address parameter contains a Group address and the MP Loopback Responder state machine resides in an MHF (rather than in a MEP), ProcessLBM( ) discards the LBM and performs no further processing.

3. If the source_address parameter is a Group, and not an Individual MAC address, ProcessLBM( ) discards the frame and performs no further processing.

4. ProcessLBM( ) processes the LBM according to subclause 20.46.4.2 of IEEE802.1ag/D8.1, and may validate the LBM according to subclause 20.46.4.3 and discard any frames that fail the validation.

5. If the MP is associated with a PBB-TE MP and there is either no PBB-TE TLV or there is a PBB-TE TLV but the address carried in the MIP MAC field does not match the MAC address of the receiving MHF, then ProcessLBM( ) discards the LBM and performs no further processing.

6. If the LBM was not discarded, then ProcessLBM( ) calls xmitLBR( ) to generate and transmit an LBR.

xmitLBR( )

The xmitLBR( ) in 20.26.2 of IEEE802.1ag/D8.1 is changed as follows:

xmitLBR( ) is called by ProcessLBM( ) to transmit an LBR. xmitLBR( ) constructs an LBR from the LBM contained in LBMPDU, and transmits it to the Active Service Access Point (SAP) using an M_UNITDATA.request as follows:

1. xmitLBR( ) sets the destination_address parameter to the source_address of the received LBM.

2. xmitLBR( ) sets the source_address parameter to either the MAC address of the replying MP, or to the ESP-MAC SA of any component ESP that has the original LBM's source_address in its ESP-MAC DA field, if the MP is associated with a PBB-TE MP.

3. xmitLBR( ) changes the OpCode field (23.4.3) from LBM to LBR.

4. xmitLBR( ) copies the remainder of the LBM's mac_service_data_unit verbatim to the LBR.

5. If the replying MP is a MEP, xmitLBR( ) increments the LBR transmission counter by 1 (12.14.7.1.3:ad).

xmitLBM( )

The xmitLBM( ) in 20.29.1 of IEEE802.1ag/D8.1 is changed as follows:

xmitLBM( ) is responsible for constructing and transmitting an LBM. Instead of setting the destination_address parameter from the appropriate managed object (12.14.7.3.2: b) in IEEE802.1ag, if the MEP is configured on a PBB-TE MA, the destination_address parameter takes the value of the ESP-MAC DA field of the component ESP that has the MEP's MAC address as the value of its ESP-MAC SA field. In addition a Type, Length, Value (TLV) field, the PBB-TE TLV is always inserted as the first TLV. This enables intermediate MIPs to selectively intercept LBMs that are targeting them. The MIP MAC address contains the destination MAC address for LBMs transmitted by the MEP. The format of the PBB-TE TLV is illustrated in Table 1 below.

TABLE 1

|  | Octet |
| --- | --- |
| Type = 9 | 1 |
| Length | 2-3 |
| MIP MAC address | 4-9 |

Linktrace protocol. The LBMs transmitted by a MEP associated with a PBB-TE MA use as the destination address parameter, the value of the ESP-MAC DA field corresponding to the component ESP that has the MEP's MAC address as the value of its ESP-MAC SA field. LBMs received by MPs associated with a PBB-TE MA are considered valid if they have as a destination address, an Individual MAC address that matches the ESP MAC-DA of any of the ESPs composing the PBB-TE associated with this MP. The process to identify a possible egress port by an intermediate device that implements a MIP associated with a PBB-TE MA, queries the filtering database of the corresponding bridge, using the destination_address, and the vlan_identifier of the LTM as the parameters for the lookup.

The Linktrace Message (LTM) that is forwarded by a MIP associated with a PBB-TE uses the destination_address, source_address, and vlan_identifier of the input LTM and sets the drop_eligible parameter of the forwarded LTM to false.

Finally a Linktrace Reply (LTR) issued by a MIP associated with a PBB-TE:

1. Uses as the source_address, the value in the ESP-MAC SA field of any of the component's ESP that has the original LTM's source_address in its ESP-MAC DA field.

2. Uses as the destination_address, the source_address of the original LTM.

3. Uses as the Primary VID, the value in the ESP-VID field of the component ESP that has the original LTM's source_address in its ESP-MAC DA field.

All the other Linktrace process remain the same.

It has thus been shown that the present invention provides a consistent way of identifying PBB-TE point-to-point and point-to-multipoint services. The invention provides a methodology for addressing the PBB-TE associated MPs, and enhances MEPs or MHFs with additional PBB-TE demultiplexing functions that are required for identifying independent PBB-TE service instances. The invention also provides enhancements to the basic CFM protocols: Continuity Check, Loopback, and Linktrace enabling the same behavior as the one experienced by their operation on traditional VLAN-based MAs.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates any all modifications that fall within the scope of the invention defined by the following claims:

The invention claimed is:

1. A method of monitoring traffic within a network, the method comprising:
receiving, at a first node of a network, an input linktrace message from a second node, wherein the first node comprises a maintenance association intermediate node for a traffic engineered service instance configured on the first node, and wherein the traffic engineered service instance comprises at least one pair of co-routed Ethernet Switched Paths (ESPs), each component ESP of each pair of co-routed ESPs traversing a common bridge and being associated with a tuple comprising an ESP-Medium Access Control (ESP-MAC) Destination Address (DA), an ESP-MAC Source Address (SA), and an ESP-Virtual Local Access Network IDentifier (ESP-VID), and wherein the input linktrace message includes a destination address parameter identifying the ESP-MAC DA of a first component ESP associated with the traffic engineered service instance and a Virtual Local Access Network IDentifier (VID) parameter identifying the ESP-VID of the first component ESP;
identifying an egress port on which to forward the input linktrace message based on both the destination address parameter and the VID parameter of the input linktrace message; and
forwarding the input linktrace message to a third node using the identified egress port.

2. The method of claim 1, wherein identifying an egress port comprises querying a database associated with the first node using the destination address parameter and the VID parameter of the input linktrace message as parameters for a lookup operation.

3. The method of claim 1, wherein forwarding the linktrace message comprises forwarding the input linktrace message without changing a source address parameter of the input linktrace message.

4. The method of claim 1, wherein forwarding the linktrace message comprises setting a drop eligible parameter of the forwarded linktrace message to false.

5. The method of claim 1, further comprising:
constructing a linktrace reply based on the input linktrace message; and
transmitting the linktrace reply to the second node.

6. The method of claim 5, wherein constructing the linktrace reply message based on the input linktrace message comprises:
setting a source address parameter of the linktrace reply based on an ESP-MAC SA of a component ESP that has an ESP-MAC DA that matches a source address parameter of the input linktrace message; and
setting a destination address parameter of the linktrace reply based on the source address parameter of the input linktrace message.

7. The method of claim 5, wherein constructing the linktrace reply message further comprises setting a VID parameter of the linktrace reply based on an ESP-VID of a component ESP that has an ESP-MAC DA that matches a source address parameter of the input linktrace message.

8. A method of monitoring traffic within a network, the method comprising:
constructing a linktrace message at a first node that implements a Maintenance association End Point (MEP) in a network, wherein the MEP is configured to monitor a traffic engineered service instance configured on the first node, and wherein the traffic engineered service instance comprises at least one pair of co-routed Ethernet Switched Paths (ESPs) with each component ESP of each pair of co-routed ESPs traversing a common bridge and being associated with a tuple comprising an ESP-Medium Access Control (ESP-MAC) Destination Address (DA), an ESP-MAC Source Address (SA), and an ESP-Virtual Local Access Network IDentifier (ESP-VID); and wherein constructing the linktrace message comprises:
  setting a source address parameter of the linktrace message based on a MAC address of the MEP; and
  setting a destination address parameter of the linktrace message based on an ESP-MAC DA of a component ESP that has the MAC address of the MEP as its ESP-MAC SA;
  setting a VID parameter of the linktrace message based on a VID of the MEP; and
  transmitting the constructed linktrace message to a second node in the network.

9. The method of claim 8, wherein transmitting the constructed linktrace message to a second node comprises:
  transmitting the constructed linktrace message to an intermediate node on the component ESP that has the MAC address of the MEP as its ESP-MAC SA; and
  receiving a linktrace reply from the intermediate node in response to the linktrace message.

10. The method of claim 9, wherein receiving a linktrace reply from the intermediate node in response to the linktrace message comprises receiving a linktrace reply that includes:
  a source address parameter that matches an ESP-MAC SA of a component ESP that has the MAC address of the MEP as its ESP-MAC DA; and
  a destination address parameter that matches the MAC address of the MEP.

11. The method of claim 10, wherein the linktrace reply further includes a VID parameter that matches an ESP-VID of a component ESP that has the MAC address of the MEP as its ESP-MAC DA.

12. An apparatus for monitoring traffic within a network, the apparatus comprising:
  a first bridge comprising:
    one or more ports, each port configured to couple to a network and to communicate to a respective other bridge within the network;
    a linktrace responder configured to:
      receive an input linktrace message from a second bridge of a traffic engineered service instance comprising at least one pair of co-routed Ethernet Switched Paths (ESPs) established on the network, each component ESP of each pair of co-routed ESPs traversing a common bridge and being associated with a tuple comprising an ESP-Medium Access Control (ESP-MAC) Destination Address (DA), an ESP-MAC Source Address (SA), and an ESP-Virtual Local Access Network IDentifier (ESP-VID), wherein the input linktrace message includes a destination address parameter identifying the ESP-MAC DA of a first component ESP associated with the traffic engineered service instance and a Virtual Local Access Network IDentifier (VID) parameter identifying the ESP-VID of the first component ESP;
      identify, from among the one or more ports, an egress port on which to forward the input linktrace message based on both the destination address parameter and the VID parameter of the input linktrace message; and
      forward the input linktrace message to a third bridge using the identified egress port.

13. The apparatus of claim 12, wherein the linktrace responder is configured to identify an egress port by querying a database associated with the first bridge using the destination address parameter and the VID parameter of the input linktrace message as parameters for a lookup operation.

14. The apparatus of claim 12, wherein the linktrace responder is configured to forward the linktrace message by forwarding the input linktrace message without changing a source address parameter of the input linktrace message.

15. The apparatus of claim 12, wherein the linktrace responder is configured to forward the linktrace message by setting a drop eligible parameter of the forwarded linktrace message to false.

16. The apparatus of claim 12, wherein the first bridge is further configured to:
  construct a linktrace reply based on the input linktrace message; and
  transmitting the linktrace reply to the second bridge.

17. The apparatus of claim 16, wherein the first bridge is configured to construct the linktrace reply message based on the input linktrace message by:
  setting a source address parameter of the linktrace reply based on an ESP-MAC SA of a component ESP that has an ESP-MAC DA that matches a source address parameter of the input linktrace message; and
  setting a destination address parameter of the linktrace reply based on the source address parameter of the input linktrace message.

18. The apparatus of claim 16, wherein the first bridge is configured to construct the linktrace reply message by setting a VID parameter of the linktrace reply based on an ESP-VID of a component ESP that has an ESP-MAC DA that matches a source address parameter of the input linktrace message.

19. An apparatus for monitoring traffic within a network, the apparatus comprising:
  a first bridge comprising:
    one or more ports, each port configured to couple to a network and to communicate to a respective other bridge within the network;
    a linktrace initiator configured to:
      construct a linktrace message for a Maintenance association End Point (MEP) implemented by the first bridge, wherein the MEP is configured to monitor a traffic engineered service instance configured on the first node, and wherein the traffic engineered service instance comprises at least one pair of co-routed Ethernet Switched Paths (ESPs) with each component ESP of each pair of co-routed ESPs traversing a common bridge and being associated with a tuple comprising an ESP-Medium Access Control (MAC) Destination Address, an ESP-MAC Source Address (SA), and an ESP-Virtual Local Access Network IDentifier (ESP-VID); and wherein the first bridge is configured to construct the linktrace message by:
        setting a source address parameter of the linktrace message based on a MAC address of the MEP; and
        setting a destination address parameter of the linktrace message based on an ESP-MAC DA of a component ESP that has the MAC address of the MEP as its ESP-MAC SA;
        setting a VID parameter of the linktrace message based on a VID of the MEP; and
      transmit the constructed linktrace message to a second bridge in the network.

20. The apparatus of claim 19, wherein the linktrace initiator is configured to transmit the constructed linktrace message to a second bridge by:
  transmitting the constructed linktrace message to an intermediate node of the component ESP that has the MAC address of the MEP as its ESP-MAC SA; and
  receiving a linktrace reply from the intermediate node in response to the linktrace message.

21. The apparatus of claim 20, wherein the linktrace initiator is configured to receive a linktrace reply from the intermediate node in response to the linktrace message by receiving a linktrace reply that includes:
  a source address parameter that matches an ESP-MAC SA of a component ESP that has the MAC address of the MEP as its ESP-MAC DA; and
  a destination address parameter that matches the MAC address of the MEP.

22. The apparatus of claim 21, wherein the linktrace reply further includes a VID parameter that matches an ESP-VID of a component ESP that has the MAC address of the MEP as its ESP-MAC DA.

* * * * *

UNITED STATES PATENT AND TRADEMARK OFFICE
CERTIFICATE OF CORRECTION

PATENT NO. : 8,837,299 B2  
APPLICATION NO. : 13/405610  
DATED : September 16, 2014  
INVENTOR(S) : Saltsidis Page 1 of 1

It is certified that error appears in the above-identified patent and that said Letters Patent is hereby corrected as shown below:

In the Specification,

In Column 2, Line 44, delete "(I-STDs)," and insert -- (I-SIDs), --, therefor.

In Column 2, Line 46, delete "I-SIDS." and insert -- I-SIDs. --, therefor.

In Column 3, Line 39, delete "Backbone, Edge" and insert -- Backbone Edge --, therefor.

In Column 4, Line 62, delete "VI Ds" and insert -- VIDs --, therefor.

In Column 7, Line 67, delete "claims:" and insert -- claims. --, therefor.

Signed and Sealed this  
Twelfth Day of May, 2015

Michelle K. Lee  
*Director of the United States Patent and Trademark Office*